United States Patent [19]

Raynak

[11] Patent Number: 5,437,130
[45] Date of Patent: Aug. 1, 1995

[54] SYSTEM AND METHOD FOR PREFABRICATING A FREE STANDING WOODEN SPLIT-JAMB, DOOR AND TRIM ASSEMBLY

[76] Inventor: Gene A. Raynak, 2021 NE. 22nd, Portland, Oreg. 97214

[21] Appl. No.: 59,821

[22] Filed: May 10, 1993

[51] Int. Cl.6 .............................. F06B 1/06; F06B 1/08
[52] U.S. Cl. ........................................ 52/210; 52/211; 52/217; 52/656.1; 52/656.2; 52/656.4; 403/231; 403/403
[58] Field of Search ...................... 52/211, 217, 656.4, 52/656.1, 656.2, 210, 212, 656.5, 204.53, 211, 217; 403/401, 402, 403, 231

[56] References Cited

U.S. PATENT DOCUMENTS

| | | |
|---|---|---|
| 2,711,564 | 6/1955 | Jackson . |
| 2,736,930 | 3/1956 | Longley . |
| 2,853,161 | 9/1958 | Mascari . |
| 2,997,750 | 8/1961 | Lester . |
| 3,040,390 | 6/1962 | Carlton . |
| 3,239,978 | 3/1966 | Parker . |
| 3,420,003 | 1/1969 | Cline . |
| 3,520,085 | 7/1970 | Pond . |
| 3,545,135 | 12/1970 | Lieber . |
| 3,599,373 | 8/1971 | Coykendall . |
| 3,609,928 | 10/1971 | Mock . |
| 3,707,057 | 12/1972 | Frydenberg . |
| 3,757,473 | 9/1973 | Mundy . |
| 3,800,488 | 4/1974 | Swanson . |
| 3,981,103 | 9/1976 | McAllister . |
| 4,012,868 | 3/1977 | Andruszkiewicz . |
| 4,223,494 | 9/1980 | Wendt . |
| 4,281,480 | 8/1981 | Wendt . |
| 4,473,981 | 10/1984 | Simpson ............... 52/211 |
| 4,589,229 | 5/1986 | Warren . |
| 4,811,533 | 3/1989 | Wetsel . |
| 5,105,596 | 4/1992 | Wertitsch et al. . |

Primary Examiner—Carl D. Friedman
Assistant Examiner—Christopher Todd Kent
Attorney, Agent, or Firm—Kolisch, Hartwell, Dickinson, McCormack & Heuser

[57] ABSTRACT

A free standing door jamb and trim system is completely prefabricated prior to shipping and installing the jamb in a doorway. The jamb is securely stabilized in a square orientation by gluing it to a three-sided trim frame with glued mitered square corner joints. The combination of adhesively bonding the square mitered joints of the trim frame, and adhesively bonding the trim frame to the front of the door jamb, produces an exceptionally strong door jamb assembly which can independently support a swinging door without attachment to the wall.

A system and method for producing a prefabricated free sanding wooden door, jamb and trim assembly is provided. A preferred door/jamb assembly includes a first leg, a second leg and a first header. Each of the first and second legs are squarely connected to an end of the first header. A front trim frame includes a first side piece, a second side piece and a first top piece dimensioned to frame the sides and the top of the doorway. Each of the first and second side pieces is glued to a mitered end of the first top piece to form rigid mitered corner joints so that the first and second side pieces are securely maintained in a parallel relationship to each other and in a perpendicular relationship to the first top piece. The front trim frame is glued to the front side of the door jamb so that the front trim frame provides substantial support to maintain the square orientation of the door jamb. A door is attached via hinges to the first leg of the door jamb.

11 Claims, 6 Drawing Sheets

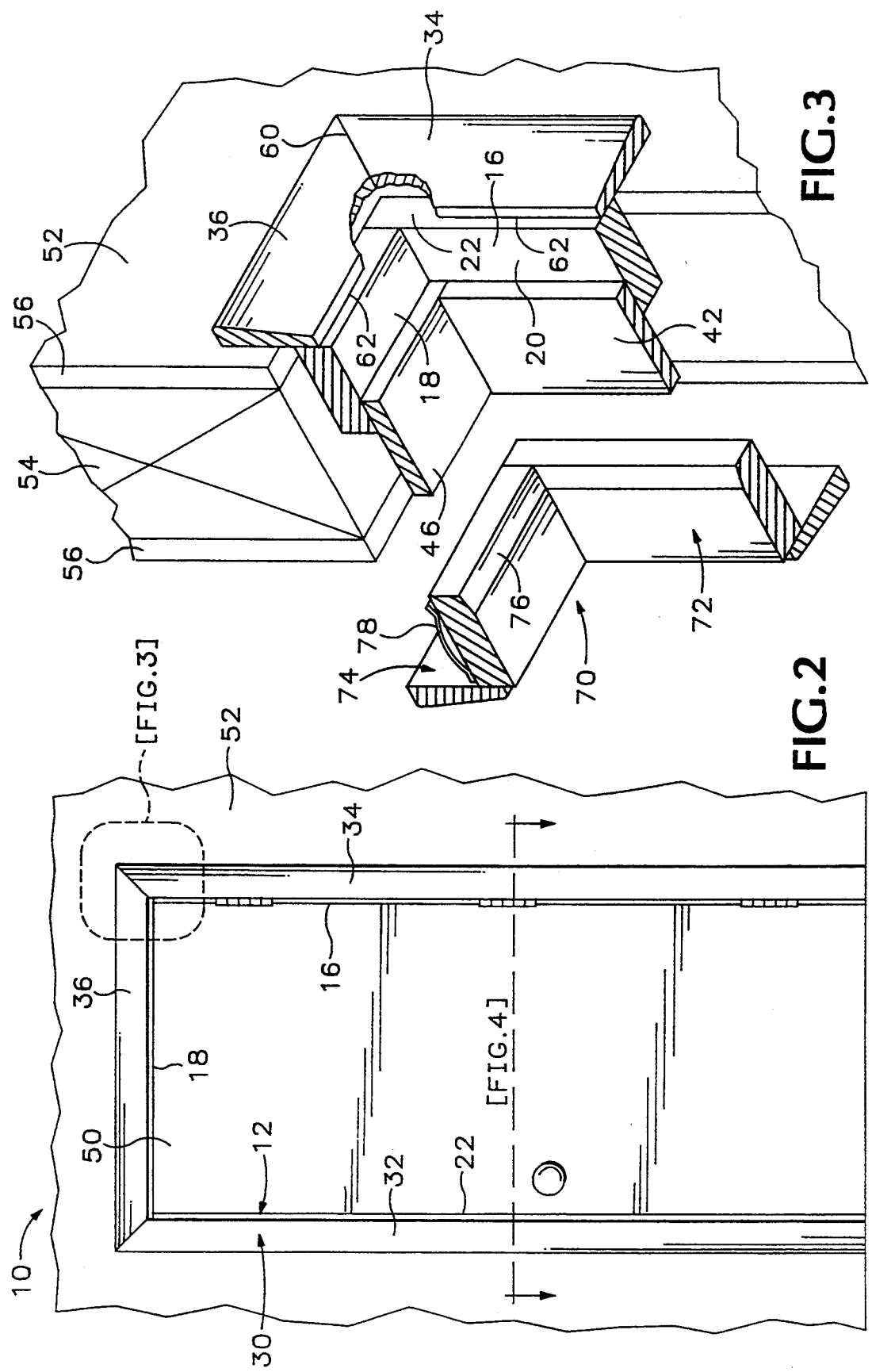

SYSTEM AND METHOD FOR PREFABRICATING A FREE STANDING WOODEN SPLIT-JAMB, DOOR AND TRIM ASSEMBLY

FIELD OF THE INVENTION

The present invention relates to interior wood door/jamb systems and improved methods of prefabrication and installation. In particular, the invention involves a system and method for prefabricating a free standing split door/jamb assembly which is squared and plumbed independently from the wall prior to installation and is sufficiently rigid to maintain its square orientation while supporting a swinging door without attaching the jamb to the wall. The jamb system of the present invention is easier to install than prior systems and is more adaptable to varying wall opening dimensions.

BACKGROUND OF THE INVENTION

More than fifteen million interior door/jamb systems are installed in the United States alone each year. The great majority of these doors are supplied to the job site as a "pre-hung door". A typical pre-hung door takes approximately 60-90 minutes for a skilled carpenter to install and involves plumbing, shimming and attaching the door jamb to wall studs, attaching trim around the door opening to hide the gap between the jamb and the wall, and finally hinging the door to the jamb and installing the hardware.

The most difficult and time consuming part of installing a pre-hung door is squaring and plumbing the door jamb so that the door can freely swing between opened and closed positions and remain at rest in any single open position. Others have attempted to provide mechanisms for simplifying the jamb squaring and plumbing process.

For example, Putnam Products of Old Saybrook, Connecticut offers a tool called a "JAMJIG TM" which supposedly holds the jamb in square alignment so that the installer's hands are free to shim and fasten the jamb to the rough opening. Although tools such as the JAMJI TM may be helpful in partially simplifying the plumbing process, it is an object of the present invention to completely eliminate the need for on-site squaring, plumbing and shimming of the jamb. It is also desirable to decrease or eliminate the need for special tools or special carpentry expertise on the job site.

Others have attempted to simplify door installation by proposing partially preassembled door/jamb systems. For example, each of U.S. Pat. Nos. 3,707,057, to Frydenberg, 3,599,373 to Coykendall, 2,711,564 to Jackson and 2,736,930 to Longley, disclose a partially preassembled split jamb system with an adjustment mechanism for varying the collective width of the jamb to accommodate differences in wall thickness. However, the door frame assemblies disclosed in these patents require plumbing of the jamb legs and attachment of the header portion of the jamb during installation. None of the door/jamb systems disclosed in these patents are completely prefabricated. They all require some assembly of jamb and trim components during installation at the job site and they all require elaborate mechanisms for attaching the jamb to the wall.

Another problem with the prior devices is that the split/jamb components are attached to each other during installation. Therefore, after the unit is installed the jamb and trim assembly is not capable of accommodating shrinkage or expansion of the wall width.

It has apparently been a fundamental concept in prior door/jamb systems to rely on the wall structure to support and maintain the square orientation of the door jamb throughout the life of a swinging door. As noted by Jackson in U.S. Pat. No. 2,711,564, column 1, lines 43-48:

The support of jamb members by trim strips has not been found satisfactory in that the jamb may shift from the weight of the suspended door or from warping of the jamb or trim strips, or from other causes. It is important, therefore, rigidly to affix the jamb of the door casing to the rough buck of the rough door opening.

Thus, prior innovators have focused their efforts on improving the methods of attaching a jamb to a wall. However, regardless of the attachment mechanism, in order to make the connection, it is inherently necessary to vertically align the jamb, i.e., shim and plumb the legs of the jamb, relative to the wall and floor. Nobody has previously been able to produce a truly prefabricated unit which is pre-squared and pre-plumbed independently from the wall and is capable of standing independently and supporting a swinging door without attachment to the wall.

Another problem with door jambs being attached to the wall, is that the shape, angles or dimensions of the wall opening are different from site to site, and may change after the door is installed, for example, due to wood shrinkage, settling, earthquakes or other natural causes. If the door jamb and trim are anchored to the wall, then changes in the wall opening dimensions will cause corresponding shifts in the door frame resulting in door functioning problems as well as flaws in the appearance of the door, jamb and trim.

Regardless of what the reasons are, previously disclosed "prefabricated" door/jamb units are not currently being used with any significant frequency, if at all in the construction industry.

SUMMARY OF THE INVENTION

I have invented a prefabricated door jamb system which is fundamentally different from previous systems in that it is free standing, i.e., squared and plumbed independently from the wall and does not require support from the wall. The door/jamb system of the present invention does not require any attachment mechanism between the system and the wall for support of the door. It is easier to install and less affected by varying wall dimensions. It is a completely preassembled free standing integral unit and can be installed analogously to a prefabricated cabinet.

I have discovered that a surprisingly strong square joint can be produced with standard dimension lumber by employing wood glue at critical joints, recognizing that wood glue is capable of producing a significantly stronger joint than other fastening mechanisms such as nails, staples, screws, etc.

In the door/jamb system of the present invention a prefabricated jamb and trim system is produced by creating two critical wood glue joints. First, wood glue is applied to the mitered square corner joints of a three sided plumb-aligned trim frame. Second, a continuous wood glue layer is applied between the trim frame and a square door jamb. The glued trim frame corner joints provide strong resistance to forces exerted on the system in a plane parallel to the frame such as the forces applied to the jamb by a door in the closed position. The trim frame alone, however, is susceptible to being torqued or twisted out of its static plane, particularly by forces such as those exerted on the jamb when the door is open. In contrast to the trim frame, the square jamb is less strong with respect to forces in the plane of a closed door, but is stronger in resisting forces outside of the trim plane, such as those exerted on the door jamb by an open door. The complimenting strengths of a square trim frame and a square jamb are cooperatively and beneficially combined by gluing the trim frame to the front of the jamb. A surprisingly rigid prefabricated free standing, independently plumb aligned door jamb is thereby produced.

The prefabricated free standing wood door, jamb and trim assembly includes a wood door jamb glued to a wood front trim frame. The jamb includes a first leg, a second leg and a first header. Each of the first and second legs are squarely connected to an end of the first header. The front trim frame includes a first side piece, a second side piece and a first top piece dimensioned to frame the sides and top of the doorway. Each of the first and second side pieces are glued to an end of the first top piece so that the first and second side pieces are securely maintained in a parallel relationship to each other and in a perpendicular relationship to the first top piece. The front trim frame is glued to the front side of the door jamb so that the front trim frame provides substantial support to maintain the square orientation of the door jamb. Then a door is hinged to the first leg on the inner side of the jamb.

In a preferred embodiment, a wooden back trim structure is provided for cooperative assembly with the door jamb. The back trim structure includes an inside trim board attached to a back trim frame. The inside trim board has a third leg, a fourth leg and a second header. Each of the third and fourth legs are squarely connected to opposite ends of the second header. The back trim frame includes a third side piece, a fourth side piece and a second top piece dimensioned to frame the sides and top of the doorway. Each of the third and fourth side pieces are glued to an end of the second top piece so that the third and fourth side pieces are securely maintained in a parallel relationship to each other and in a perpendicular relationship to the second top piece. The back trim frame is glued to the back side of the inside trim board so that the back trim frame provides substantial support to maintain the square orientation of the inside trim board. A continuous wooden door stop is attached to the inner side of the door jamb so that the stop overlaps the inner side of the inside trim board when the assembly is installed in the doorway. The door jamb and back trim structure can be attached to opposing wall surfaces and are allowed to slide relative to each other to accommodate varied changing wall dimensions.

A production method is also provided by the present invention, in which a squared trim frame is glued to a door jamb prior to installing the jamb in a doorway. The trim frame is three-sided and includes two rigid glued miter joints, providing substantial structural strength in the plane of the frame parallel to the wall. Next, by adhesively bonding the trim frame to the front side of the door jamb, the trim frame is stabilized within its plane so that the entire assembly exhibits substantial strength and rigidity and is capable of anchoring a swinging door and maintaining its square orientation without being fastened to the wall.

An alternate embodiment of the present invention is provided to accommodate a pocket door. The first leg of the door jamb and the third leg of the inside trim board each have a reduced width which is short enough to allow the pocket door to pass from a pocket in the wall into the doorway. The second leg of the door jamb is long enough to stop the pocket door when the door is closed. Casing portions are provided on the second leg adjacent to the closed door for blocking light from passing between the door and the jamb.

The present invention allows an unskilled laborer to install an interior door in significantly less time than has been previously required for installation of a conventional pre-hung door by a skilled carpenter. An important reason for this, is that there is no need for the installer to fasten the jamb to the wall or to square the legs and head of the jamb.

BRIEF DESCRIPTION OF THE DRAWINGS

FIG. 2 is a front view of a door/jamb assembly of the present invention installed in a wall.

FIG. 3 is a partial perspective exploded view of a corner region of the door/jamb assembly shown in FIG. 2.

DETAILED DESCRIPTION OF THE PREFERRED EMBODIMENTS

Figure 1:
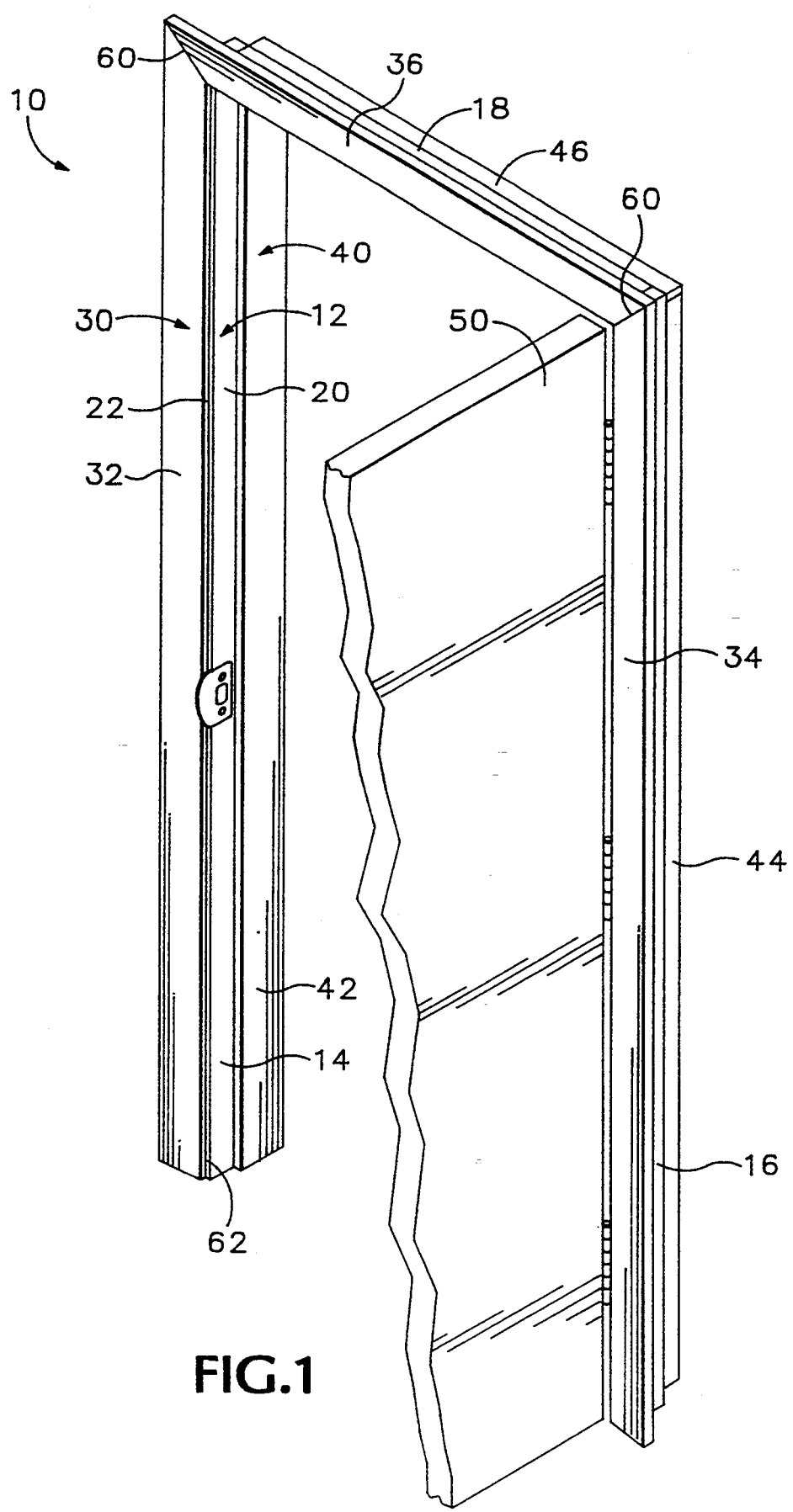
FIG. 1 is a perspective view of a free standing, prefabricated door/jamb assembly in accordance with a preferred embodiment of the present invention.

FIG. 1 shows an entire prefabricated door, jamb and stop system, unit 10, which is ready to install into an interior doorway opening in a wall. The unit 10 is fully self-supporting and does not need to be anchored to the wall. The unit is also pre-plumbed so that there is no need to shim the jamb with respect to the wall.

The prefabricated unit 10 of the present invention is produced with "standard dimension lumber", meaning that the wood pieces which are assembled into the prefabricated unit are not custom cut, but are the same stock which is typically milled, commercially available and used to produce regular pre-hung doors in the prior art. "Standard dimension wood stock" means standard dimension lumber or wood particle board of the same standard dimensions.

The unit 10 includes a jamb 12 and a trim frame 30. The jamb 12 has a first leg 14, a second leg 16 and a first header 18. Legs 14 and 16 are squarely connected to opposite ends of the header 18. Each of legs 14 and 16 form a square butt-end joint with header 18.

The trim frame 30 includes a first side piece 32, a second side piece 34 and a first top piece 36. The top piece 36 is mitered at both ends and each of the side pieces 32 and 34 are mitered at their respective top ends where they are glued to the top piece to form a rigid square mitered joint. A door stop 40 is attached to the inner side of the jamb 12. The stop 40 includes vertical legs 42, 44 and top piece 46. Each of vertical legs 42 and 44 form a square butt-end joint with top piece 46. A door 50 is hinged to the jamb 12. Jamb 12 has an inner side 20 and a front side 22.

FIG. 2 shows the unit 10 installed in a wall 52. Dotted line 3 marks a corner of the door/jamb assembly which has been exploded and rotated in FIG. 3 to illustrate important refinements of the invention which allow the jamb to be squared and plumbed independently from the wall and sufficiently rigid to support a swinging door without anchoring the jamb to the wall.

In order for the three-sided jamb to be strong enough to support a door without attachment to the wall, it is very important that the corners be square, and that the components of the joint be strongly and rigidly joined so that the daily stresses exerted on the jamb by a swinging door will not significantly alter the square orientation of the jamb over the life of the structure. No one has previously taught or suggested a method of producing such a joint out of standard dimension lumber which could eliminate the need to anchor the jamb to the wall.

In the present invention, it has been found that, by applying wood glue in two critical joinder regions, a three-sided square frame structure having outstanding physical strength and rigidity is produced. While others have occasionally used adhesive in some capacity for installing a door, jamb or trim system, it has usually been employed only as an interchangeable mechanism in the context of other fasteners such as nails, staples or screws. However, we have determined that adhesive, i.e., wood glue, is far superior to other fasteners for producing a strong joint between pieces of wood. It has been discovered that a glued joint between two pieces of wood is substantially stronger than a single continuous piece of wood. This may be due in part to the crossing orientation of the grain on the joined pieces of wood and the fact that highly effective wood glues have been developed and are now commercially available. For example, a preferred aliphatic resin type glue is available from Ralph Wilson Plastics Co. in Temple, Tex., 96504, and is sold under the name LOK WELD 20 ® woodworking glue.

The term "structural support joint" shall be used to refer to each of the two joinder locations 60 and 62, shown in FIG. 3. Structural support joint 60 is a mitered joint between trim frame pieces 34 and 36. The miter angle is 45° relative to the vertical direction. The second structural joint 62 is between the trim frame 34 and the front side 22 of the jamb 16. The structural support joints are formed by squaring, gluing and tack-nailing prior to shipping and installing the unit at the job site. It is important that the wood glue be amply applied and spread out over substantially the entire contact area in each of the structural support joints so that maximumly strong joints are produced.

As shown in FIG. 1, additional strength and support is provided to the jamb by gluing the door stop 40 to the inner side of the jamb 12.

When a door is in its closed position the most significant forces which are applied to the jamb are in a plane parallel with the plane of the trim frame 30. In this situation, the integrity of structural joint 60 is critical. However, when the door swings open, forces are applied to the hinged side of the door jamb which pass through the plane of the trim frame 30 (FIG. 2). The trim frame alone is not strong enough to support such forces. However, by solidly connecting the trim frame 30 to the jamb 20 along structural joint 62, the trim frame is reinforced, and the combined unit is sufficiently strong to support a swinging open door. The combination of wood glued structural joints 60 and 62 provide substantial strength and rigidity for supporting even a solid wood door without external structural support.

Also shown in FIG. 3, is a portion of a back trim structure 70 which is used to finish the back side of the doorway in a preferred embodiment of the present invention. The back trim structure 70 includes an inside trim board 72 dimensioned to compliment the door jamb 12. The inside trim board 72 is bonded to a back trim frame 74. The inside trim board 72 and back trim frame 74 are preferably glued together. However, the joinder mechanisms for these pieces is less critical than those of the jamb, because the back trim structure does not need to support a swinging door. A corner 76 of the inside trim board 72 is slightly beveled or chamfered to facilitate easy sliding installation next to door stop 40. A spring mechanism 78 is provided on the back side of inside trim board 72 in order to urge the inside trim board of the back trim structure against door stop 40 producing a friction connection. No other attachment mechanism for the back trim frame is necessary. However, in one embodiment of the invention an adhesive layer such as double stick adhesive tape is provided on the back of back trim frame 74 so that the back trim structure will be attached to the outside of dry wall 56, as shown in FIG. 3.

Figure 4:
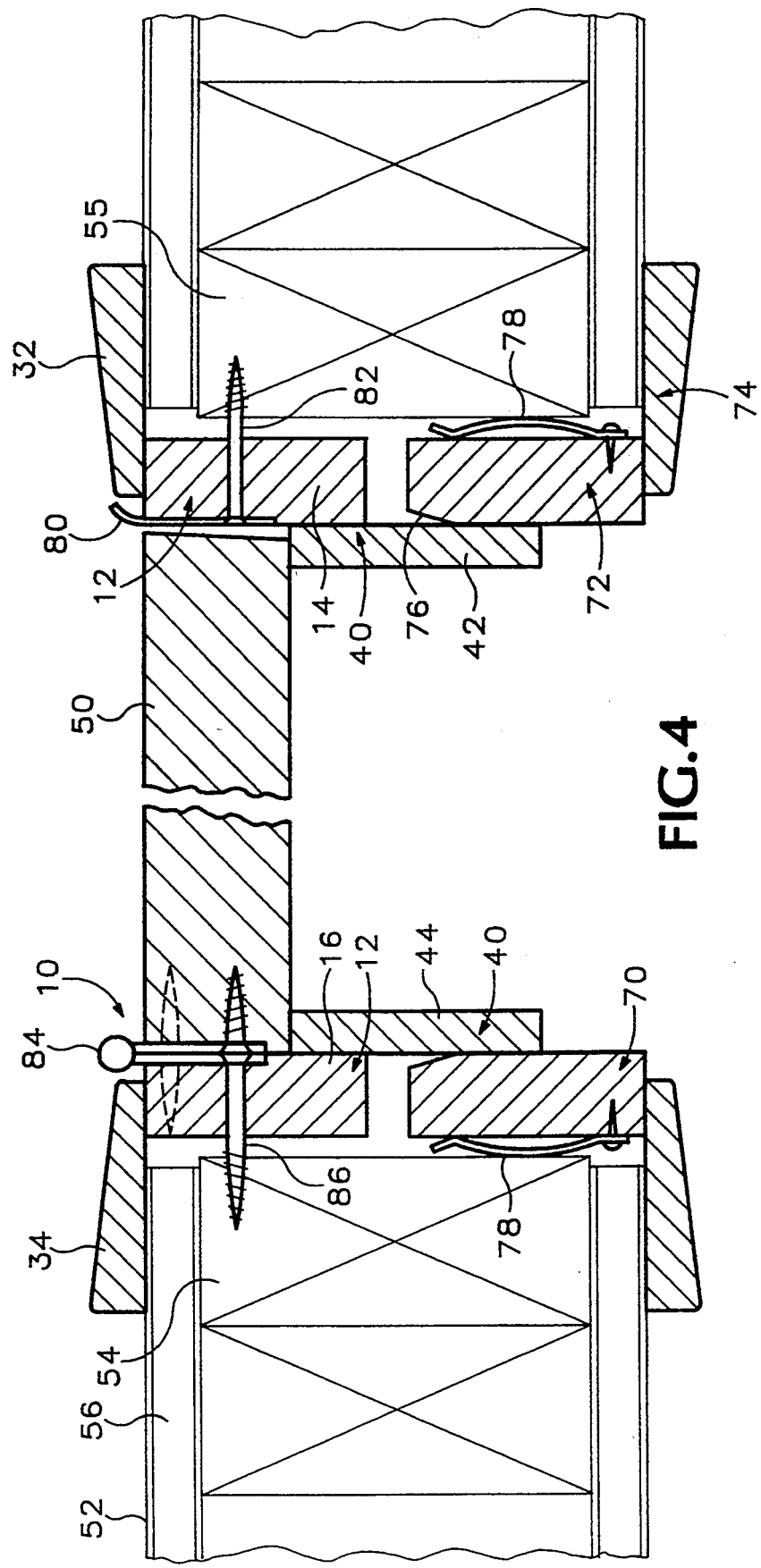
FIG. 4 is a sectional view taken through the installed door/jamb assembly illustrated in FIG. 2.

An important feature of the present invention, as illustrated in FIGS. 3 and 4, is that the back trim structure contacts, but is not attached to the door/jamb assembly. Spring mechanism 78 is used to urge the inside trim board 72 against door stop 40 and to create a friction connection between the assembly and the wall. However, this is different from prior split jamb systems which have always provided mechanisms for attaching the front and back jamb portions in addition to attaching the jamb to the wall. Thus, in the present invention, a "floating" condition is produced between the door/jamb unit 10 and the back trim structure 70. The floating condition is desirable because wall thickness and opening dimensions may change over a period of years. For example, wall width may shrink slightly causing the trim to pull away from the wall. Also, ground settling or shaking may cause a wall opening to change shape. Unlike prior door/jamb systems which are connected to the wall and universally bound to both sides of the wall, the door/jamb assembly of the present invention will maintain its square orientation and will actually "float" i.e., expand or contract with shifting external wall surfaces.

FIG. 4 shows a cross section taken through the installed door/jamb unit 10 and wall shown in FIG. 2. Although not necessary, it is sometimes preferable to provide some connection between the jamb legs 16, 14 and wall studs 54. One way to do this is to install a pair of screws through opposite legs of the jamb. For example, strike plate 80 can be fastened with at least one screw 82 which is long enough to penetrate stud 55. Similarly, hinge 84 can be fastened to jamb leg 16 by at least one screw 86 which is long enough to penetrate stud 54. It can be seen in FIG. 4 that even when jamb 12 is connected to the wall 52, back trim structure 70 is still free to float with respect to door stop 40. It should be noted that, unlike the prior art door jambs, the screw attachments described above only function to maintain the door/jamb in the plane of the wall. The screws 82 and 86 do not function to provide wall support for the door, and their installation has no affect on the pre-squared and pre-plumbed orientation of the jamb.

In FIG. 4 the thickness of the door 50 is between 1⅜-inches and 1¾-inches. The width of the trim 30 varies from 1¾-inches to 3-inches. The wall studs 54 are 2-inches by 4-inches. The width of the door stop 40 is 2-inches. The thickness of the door stop 40 is ⅜-inch. The width of the jamb 12 is 2½-inches. The width of the inside trim board 72 is 1¾-inches. The thickness of the jamb 12 and the inside trim board 72 is ⅜-inch.

FIG. 4 illustrates the relative widths of the jamb 12 relative to the inside trim board 72 of the back trim structure 70. Minimumly, the jamb 12 must be as wide as the door plus ⅜-inch to provide sufficient area to glue the door stop 40 on. It can be seen that the door/jamb assembly of the present invention utilizes less lumber than conventional pre-hung door/jambs because there is no need for the jamb to span the entire thickness of the wall.

Figure 5:
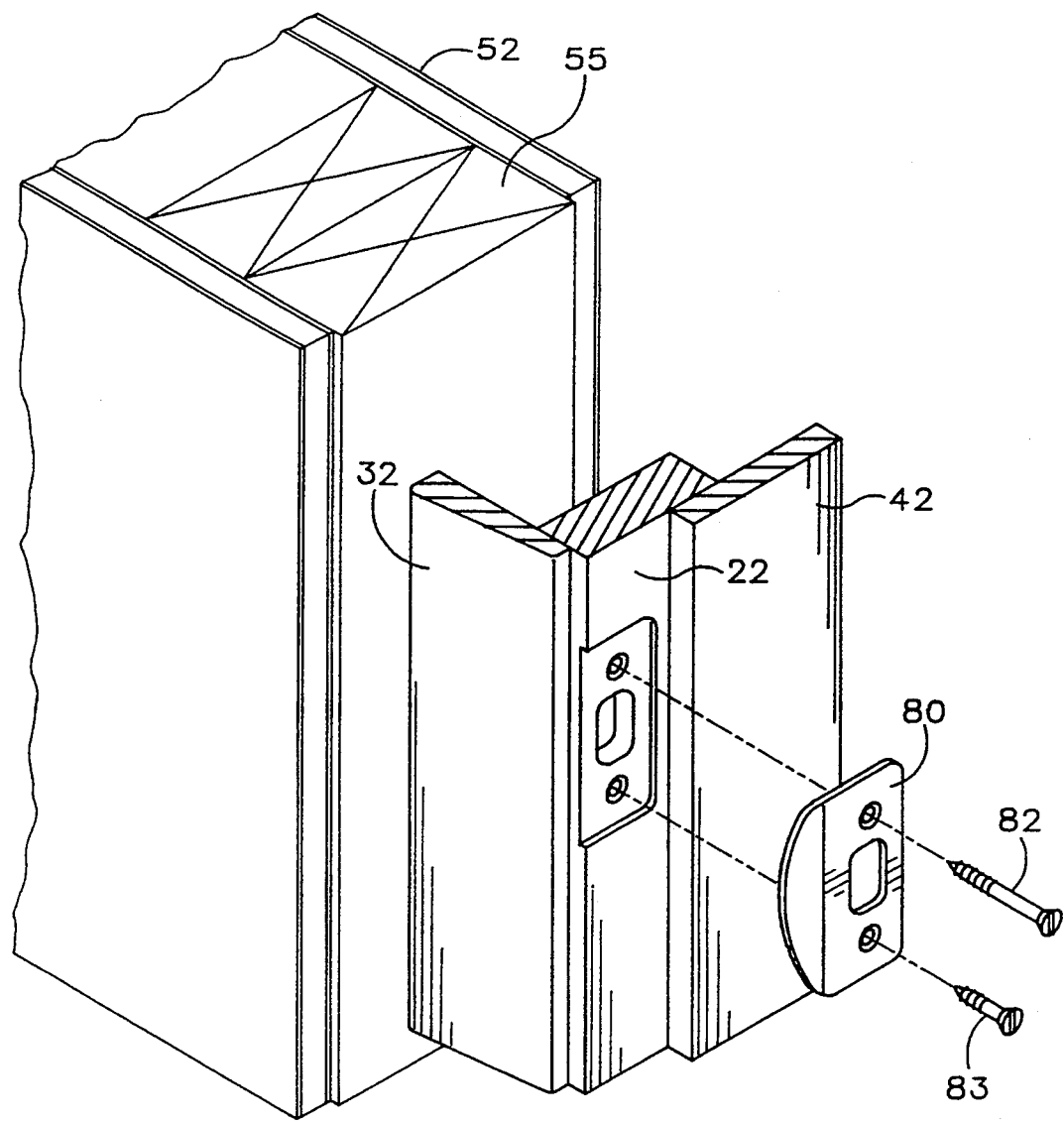
FIG. 5 is a partial exploded view of a door/jamb assembly illustrating a preferred mechanism for anchoring a leg of the jamb to the wall through a strike plate.

FIG. 5 illustrates more clearly, the mechanism for using a strike plate screw to anchor the jamb to the wall. A standard screw 83 for mounting a strike plate will not penetrate beyond the jamb. By replacing one of the standard screws with a longer screw 82 the jamb is conveniently attached to the wall stud without extra fastening mechanisms.

Figure 6:
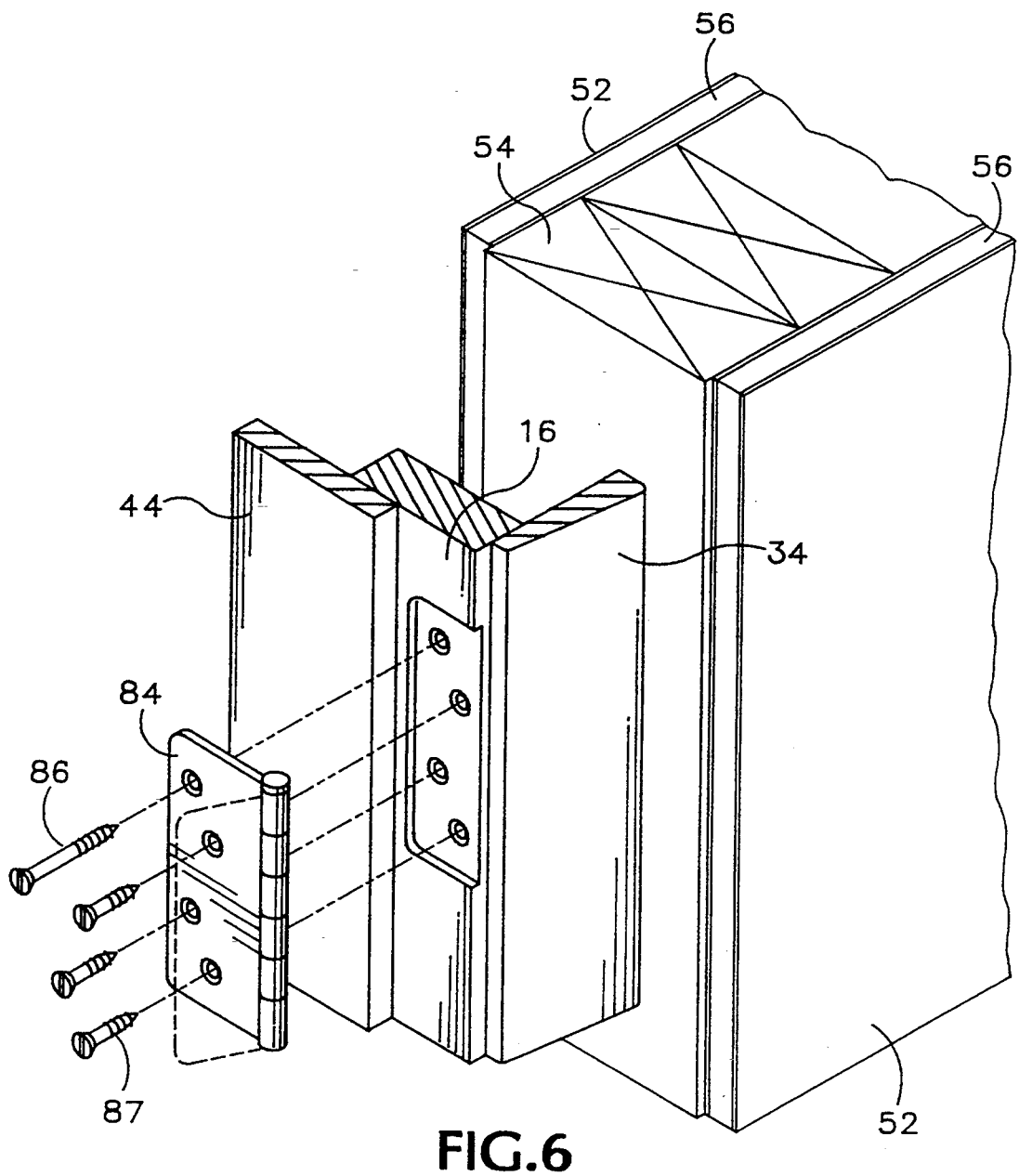
FIG. 6 is a partial exploded view of a door/jamb assembly illustrating a preferred mechanism for anchoring a leg of the jamb to the wall through a hinge plate.

Similarly, in FIG. 6 one standard hinge screw 87 is replaced with a longer screw 86 which anchors the jamb to wall stud 54.

Figure 7:
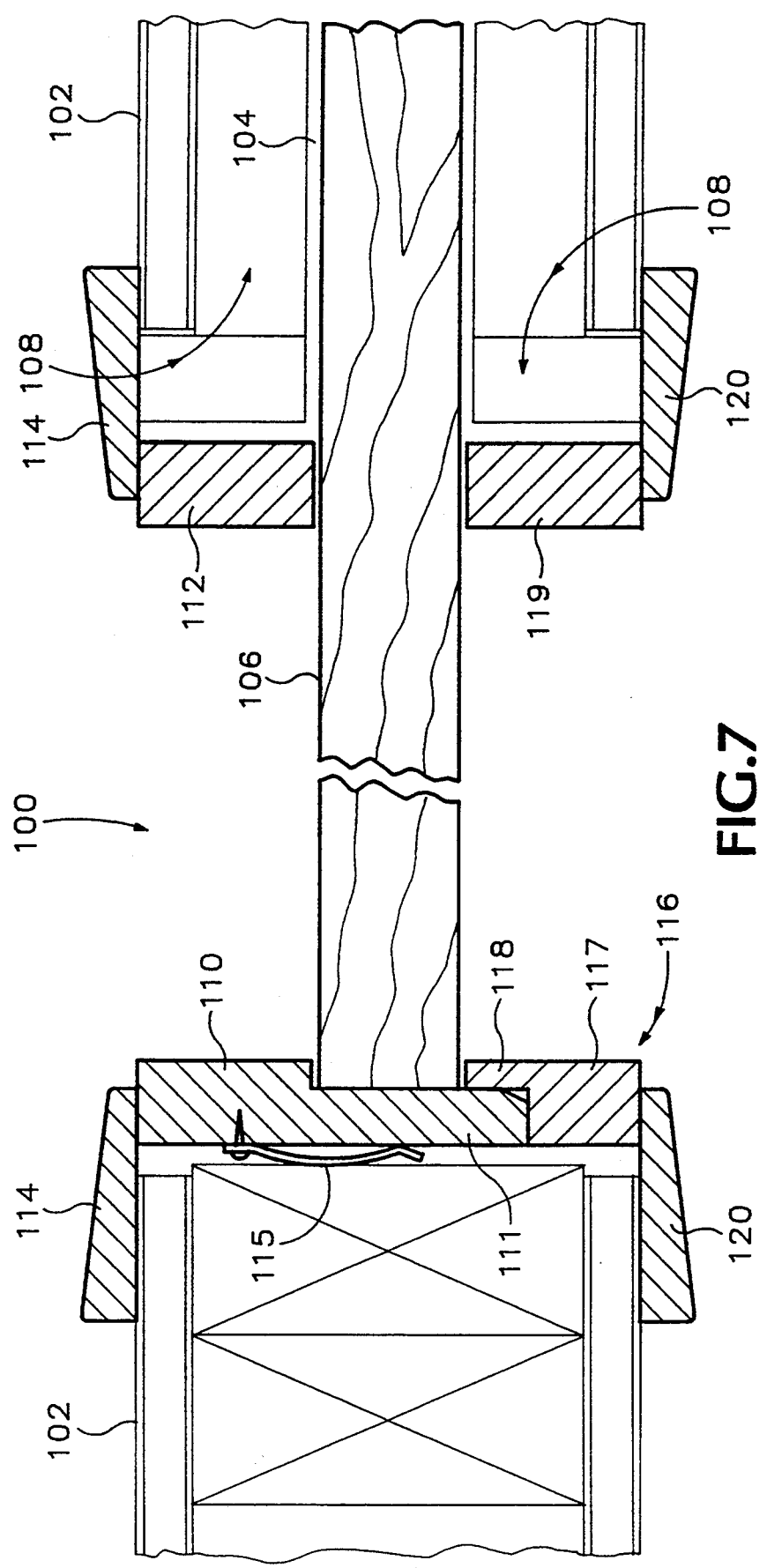
FIG. 7 is a sectional view of an alternative embodiment of the present invention in which a prefabricated, free standing jamb assembly is designed for use with a pocket door.

FIG. 7 shows a modified door/jamb unit 100 for framing a pocket door. The wall 102 has a pocket 104 for containing a sliding door 106. A pocket door assembly 108 is typically supplied and installed as a separate unit from the jamb 110. The pocket door/jamb assembly shown in FIG. 7 is the same as the hinged door described above in that it has the same two glued structural support joints.

The jamb includes a first leg 110, a second leg 112 and a header (not shown). Legs 110 and 112 differ in that leg 110 is stepped and extends across the path of the door to provide a stop for the sliding door 106. In contrast, leg 112 is shortened to allow the sliding door 106 to move between open and shut positions. The header of the jamb is analogous to leg 112.

A trim frame 114 is the jamb as the one described for the hinged door, and is glued to the front side of the jamb. A spring mechanism 115 is provided on the back side of jamb leg 110 in order to tighten the fit between the jamb assembly and the wall opening.

A back trim structure 116 has an inside trim board including leg 117 and leg 119 connected via a header (not shown). Inside trim board 117 is stepped to compliment jamb leg 110. The width of inside trim board leg 117 is short enough so that it does not interfere with the movement of the door 106 to contact stop portion 111 of jamb leg 110. A casing portion 118 of inside trim board leg 117 functions to hide the break between jamb leg 110 and inside trim board 117, and also functions to block light from passing between jamb 110 and closed door 106. This light blocking feature is believed to be an important improvement over prior pocket door/jamb configurations.

Similar to jamb leg 112, inside trim board leg 119 is short enough to permit movement of the door 106 between open and closed positions. The header of inside trim board 116 is the same as leg 119 except its length is approximately equal to the width of the doorway. A back trim frame 120 is then glued to the back side of the inside trim board 116.

The door/jamb assemblies of the present invention, preferred embodiments of which have been described above, are designed so that they can be produced with standard dimension wood stock, completely prefabricated into independently squared and plumbed, free standing cohesive units by an assembly line operation at a manufacturing site prior to shipping and installing the units at a job site, analogous to the way a cabinet would be prebuilt, shipped and installed. The units are also designed to be installed with a minimum number of tools and carpentry expertise, in wall openings of variable dimensions. Once installed, the unit is designed to maintain its dimensional integrity and angular orientation irrespective of wall shifting or settling over the life of the door/jamb system.

Importantly, unlike prior efforts to design a prefabricated wood door/jamb, the units of the present invention are designed to be practically and cost effectively produced and used without complicated manufacturing techniques, wall anchoring mechanisms or the need for specially designed parts or tools. A door/jamb system of the present invention can be produced simply by performing the following steps at a manufacturing site prior to shipping the unit for installation at a job site.

First, standard dimension wood stock is used to produce a square door jamb, including a first leg, a second leg and a first header. Each of the first and second legs have a length approximately equal to the height of the doorway, while the first header has a length approximately equal to the width of the doorway. Each of the first and second legs are squarely fastened to an end of the header to produce the door jamb. A square trim frame is produced including a first top trim piece having two opposing mitered ends, and first and second trim pieces each having a mitered end. Mitered structural support joints are produced in the trim frame by applying a continuous layer of wood glue between each of the mitered ends of the first and second side trim pieces and one of the mitered ends of the first top trim piece. The front trim frame is then joined to the door jamb by applying a continuous layer of wood glue between the front trim frame and the front side of the door jamb.

A back trim structure is then produced including an inside trim board and a back trim frame. The back trim frame includes a top trim piece having two opposing mitered ends, and two side trim pieces each having a mitered end. The inside trim board has two legs and a header. The inside trim board legs are squared and fastened to opposite ends of the second header to produce the inside trim board. Rigid mitered joints are then produced in the back trim frame by applying a continuous layer of wood glue between each of the back trim side pieces and one of the mitered ends of the back top trim piece. The back trim frame is then joined to the inside trim frame by applying a continuous layer of wood glue between the back trim frame and the back side of the inside trim frame, all of the preceding steps being performed at the manufacturing site prior to shipping and installing the door/jamb assembly at the job site.

Another preferred way of producing the door/jamb system includes the following steps. First, a four sided rectangular jig is provided. The long sides of the jig are at least as long as the legs 14 and 16 of the jamb 12. Jamb legs 14 and 16 are set into the jig, and then are glued and tack-nailed to opposite ends of header 18. Next, top trim piece 36 is glued and tack-nailed to the front side of header 18 leaving a ¼-inch reveal. Then, side trim pieces 34 and 32 are glued and tack-nailed to the front side of jamb legs 14 and 16, and are also glued and tack-nailed to form square mitered joints with top trim piece 36. This step is performed while the jamb is still in the jig. Stop top piece 46 is then glued and tack-nailed to jamb header 18. Then stop sides 42 and 44 are glued and tack-nailed to the respective inner sides of jamb legs 14 and 16. Stop legs 42 and 44 are also glued and tack-nailed to the inner side of stop header 46. Puddy is then applied over the nail holes. The jamb is mortised for hinges and strike plates. Finally, the unit is sanded and finished with primer, paint or lacquer. The back trim structure is assembled in the same jig using an analogous procedure.

Although preferred embodiments of the invention have been described in detail above, it is recognized that other variations of the invention may be made without departing from the spirit and scope of the invention, as claimed below.

I claim:

1. A prefabricated free standing wooden door, jamb and trim assembly for installation in a doorway comprising:
   a wooden door jamb including a first leg, a second leg and a first header, each of the first and second legs forming a square butt-end joint with the first header, the door jamb having an inner side and a front side;
   a wooden front trim frame including a first side piece, a second side piece and a first top piece dimensioned to frame the sides and top of the doorway, the first top piece being mitered at both ends, and each of the first and second side pieces being mitered at an upper end which is joined to one of the ends of the top piece by a continuous layer of wood glue so that the first and second side pieces are securely maintained in a parallel relationship to each other and in a perpendicular relationship to the first top piece;
   wherein the front trim frame is joined to the front side of the door jamb by a continuous layer of wood glue so that the front trim frame provides substantial support to maintain the square orientation of the door jamb;
   a door hingedly attached to the first leg on the inner side of the jamb; and
   a door stop having a horizontal piece and two vertical pieces, each vertical piece forming a butt-end joint with the horizontal piece to form a right angle;
   wherein the assembly has two corner joints, each joint having a trim-joint interface in a first plane, a jamb-joint interface in a second plane, and a stop-joint interface in a third plane, no one of the planes being parallel with any other one of the planes.

2. The assembly of claim 1 wherein the wood grain of the trim frame in a cross-sectional plane is oriented in a different direction from the wood grain of the door jamb.

3. The assembly of claim 1 further comprising:
   a wooden back trim structure for cooperative assembly with the door jamb, including an inside trim board attached to a back trim frame;
   wherein the inside trim board has a third leg, a fourth leg and a second header, each of the third and fourth legs being squarely connected to opposite ends of the second header, the back jamb having an inner side and a back side; and
   wherein the back trim frame includes a third side piece, a fourth side piece and a second top piece dimensioned to frame the sides and top of the doorway, each of the third and fourth side pieces being glued to an end of the second top piece so that the third and fourth side pieces are securely maintained in a parallel relationship to each other and in a perpendicular relationship to the second top piece; and
   wherein the back trim frame is glued to the back side of the inside trim board so that the back trim frame provides substantial support to maintain the square orientation of the inside trim board.

4. The assembly of claim 3 wherein the combined widths of the door jamb and the inside trim board is less than the width of the doorway wall, and further comprising:
   a continuous wooden door stop attached to the inner side of the door jamb so that the stop overlaps the inner side of the inside trim board when the assembly is installed in the doorway.

5. The assembly of claim 4 wherein the stop is glued to the inner side of the door jamb.

6. The assembly of claim 1 further comprising a strike plate and at least one screw long enough to penetrate the jamb and part of the wall.

7. The assembly of claim 1 further comprising a door hinge and at least one screw long enough to penetrate the jamb and part of the wall.

8. The assembly of claim 1, further comprising a wall having an opening and a stud structure sandwiched between first and second external surfaces, wherein the jamb, trim frame and door are securely held in the opening of the wall by adhesive joinder between a back surface of the trim frame and the first external surface of the wall.

9. The assembly of claim 8 further comprising a layer of double-stick adhesive bonding the back surface of the trim frame to the first external surface of the wall.

10. The assembly of claim 8, wherein there is no direct attachment of the jamb to the stud structure of the wall.

11. The assembly of claim 1 further comprising a layer of double-stick adhesive applied to a back surface of the trim frame.

* * * * *